United States Patent
Tosa et al.

(10) Patent No.: US 9,749,811 B2
(45) Date of Patent: Aug. 29, 2017

(54) ONBOARD APPARATUS, CLOUD SERVER, INTERVEHICLE COMMUNICATION SYSTEM AND INTERVEHICLE COMMUNICATION METHOD

(71) Applicant: Mitsubishi Electric Corporation, Tokyo (JP)

(72) Inventors: Takatoshi Tosa, Tokyo (JP); Yuji Hamada, Tokyo (JP); Shinji Akatsu, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/023,751

(22) PCT Filed: Nov. 21, 2013

(86) PCT No.: PCT/JP2013/081390
§ 371 (c)(1),
(2) Date: Mar. 22, 2016

(87) PCT Pub. No.: WO2015/075799
PCT Pub. Date: May 28, 2015

(65) Prior Publication Data
US 2016/0234654 A1  Aug. 11, 2016

(51) Int. Cl.
*H04W 24/00* (2009.01)
*H04W 4/04* (2009.01)
(Continued)

(52) U.S. Cl.
CPC ...... *H04W 4/046* (2013.01); *G08G 1/096791* (2013.01); *H04B 1/3822* (2013.01);
(Continued)

(58) Field of Classification Search
CPC .... H04W 4/046; H04B 1/3822; H04L 67/104; H04L 67/10; H04L 67/12; G08G 1/096791
See application file for complete search history.

(56) References Cited

U.S. PATENT DOCUMENTS 5,815,071 A * 9/1998 Doyle ............... B60K 31/0058
340/12.25
6,249,232 B1 * 6/2001 Tamura ................. G08G 1/163
180/167
(Continued)

FOREIGN PATENT DOCUMENTS

JP  2007-102690 A  4/2007
JP  2008-017318 A  1/2008
(Continued)

OTHER PUBLICATIONS

International Search Report of PCT/JP2013/081390 dated Feb. 25, 2014.

*Primary Examiner* — Ajit Patel
(74) *Attorney, Agent, or Firm* — Sughrue Mion, PLLC; Richard C. Turner (57) ABSTRACT

An apparatus includes: a vehicle information acquiring unit 10 to obtain the vehicle information about a vehicle state of its own vehicle; a cloud communication unit 11 to transmit the vehicle information obtained by the vehicle information acquiring unit 10 to a cloud server 2, and to receive the communication establishment information transmitted from the cloud server 2; an intervehicle communication unit 13 to carry out intervehicle communication; and a controller 12 to instruct the intervehicle communication unit 13 to perform the intervehicle communication and to establish communication in accordance with the communication establishment information the cloud communication unit 11 receives.

12 Claims, 5 Drawing Sheets

(51) Int. Cl.
  *G08G 1/0967* (2006.01)
  *H04B 1/3822* (2015.01)
  *H04L 29/08* (2006.01)

(52) U.S. Cl.
  CPC ............ H04L 67/10 (2013.01); H04L 67/104 (2013.01); H04L 67/12 (2013.01)

(56) References Cited

U.S. PATENT DOCUMENTS

| | | | |
|---|---|---|---|
| 6,445,308 B1* | 9/2002 | Koike | G01S 5/0072 180/167 |
| 8,560,609 B2* | 10/2013 | Nathanson | G07C 5/008 370/341 |
| 2003/0125845 A1* | 7/2003 | Carlstedt | G08G 1/161 701/1 |
| 2006/0176847 A1 | 8/2006 | Chen et al. | |
| 2008/0009280 A1 | 1/2008 | Ushiki et al. | |
| 2008/0122607 A1* | 5/2008 | Bradley | B60Q 1/0017 340/468 |
| 2009/0274093 A1* | 11/2009 | Senouci | H04L 45/06 370/328 |
| 2010/0184369 A1* | 7/2010 | Cho | H04B 7/15557 455/11.1 |
| 2012/0329520 A1* | 12/2012 | Akama | G01C 21/3688 455/557 |
| 2014/0214933 A1* | 7/2014 | Liu | H04L 67/02 709/204 |
| 2014/0302774 A1* | 10/2014 | Burke | H04H 20/57 455/3.05 |

FOREIGN PATENT DOCUMENTS

| | | |
|---|---|---|
| JP | 2011-087174 A | 4/2011 |
| JP | 2012-124936 A | 6/2012 |
| JP | 2013-033505 A | 2/2013 |
| WO | 2009/004699 A1 | 1/2009 |
| WO | 2011/024237 A1 | 3/2011 |

* cited by examiner

ONBOARD APPARATUS, CLOUD SERVER, INTERVEHICLE COMMUNICATION SYSTEM AND INTERVEHICLE COMMUNICATION METHOD

CROSS REFERENCE TO RELATED APPLICATIONS

This is a National Stage of International Application No. PCT/JP2013/081390 filed Nov. 21, 2013, the contents of which are incorporated herein by reference in its entirety.

TECHNICAL FIELD

The present invention relates to an onboard apparatus that carries out intervehicle communication, a cloud server that manages the intervehicle communication, and an intervehicle communication system and an intervehicle communication method using them.

BACKGROUND ART

Conventionally, systems have been known which share vehicle information among vehicles through intervehicle communication and which carry out vehicle control such as auto cruise control and driving support.

For example, Patent Document 1 discloses a mobile wireless communication apparatus and its intervehicle communication method that intend to achieve safe driving through intervehicle communication and to make efficient use of wireless resources by reducing the total communication traffic flowing through a wireless communication network.

In addition, Patent Document 2 discloses a method of grouping vehicles that carry out intervehicle communication, and of reducing the use load of a communication band and relieving congestion by optimizing the data transfer volume between the groups.

Furthermore, Patent Document 3 discloses a collision avoidance system in which a relay apparatus collects vehicle information transferred between vehicles, brings the vehicle information items from the individual vehicles together into single data, and transmits to the individual vehicles all together. Thus, it reduces the use load of the communication band, and decides the danger of a collision between vehicles from the mutual vehicle information acquired between the vehicles.

PRIOR ART DOCUMENT

Patent Document

Patent Document 1: WO2011/024237 A1.
Patent Document 2: Japanese Patent Laid-Open No. 2012-124936.
Patent Document 3: Japanese Patent Laid-Open No. 2013-33505.

DISCLOSURE OF THE INVENTION

Problems to be Solved by the Invention

Conventionally, it is necessary to establish intervehicle communication by directly exchanging communication establishment information between the onboard apparatuses. For example, as the communication establishment information, a communication channel (frequency) and radio field intensity used for the intervehicle communication are exchanged between the vehicles, and after these items of information are set in the apparatuses, a communication link is established and a real communication is started. Thus, it takes time to establish the intervehicle communication, which offers a problem of reducing the real communication time for exchanging the information required for the vehicle control or driving support.

In addition, since the conventional onboard apparatuses distribute the communication establishment information necessary for establishing the intervehicle communication at regular intervals, they have a problem of destabilizing the establishment and maintenance of the intervehicle communication because of overhead which is unnecessary information having nothing to do with the real communication.

For example, when one's own vehicle performs auto cruise control while carrying out intervehicle communication with vehicles immediately before and behind, and when the onboard apparatus of the own vehicle receives the communication establishment information from the onboard apparatus of the vehicle traveling ahead of the vehicle immediately before, it starts the communication establishment processing based on the communication establishment information received newly.

In this case, the new communication establishment information constitutes the overhead having nothing to do with the real communication for exchanging the information required for the auto cruise control of the own vehicle.

Furthermore, the conventional onboard apparatuses transmit the communication establishment information regardless of the positional relationships between their own vehicles and other vehicles. Thus, without map matching using map information, they cannot distinguish vehicles on the same road from those on a different road. For example, they cannot distinguish between an upper side road and a lower side road at a multilevel crossing.

Thus, when one's own vehicle is traveling on an upper side road of a multilevel crossing, and provides driving support while carrying out intervehicle communication with other vehicles traveling on the same upper side road, and if the onboard apparatus of the own vehicle receives the communication establishment information from a vehicle which travels on a lower side road and has nothing to do with the driving support, it stars the communication establishment processing based on the communication establishment information it receives newly. To avoid the problem, although it is necessary to perform map matching, if the onboard apparatus performs the map matching, the processing load of the onboard apparatus inevitably increases. Thus, the onboard apparatus is required to have a high performance computing function capable of handling the processing. In addition, the information for identifying the vehicle traveling on the lower side road, for example, is unnecessary information for the own vehicle, and exchanging such information can put pressure on the communication band.

On the other hand, since the apparatus disclosed in the Patent Document 1 transmits information only about a vehicle traveling on a non-priority road through the intervehicle communication, it can reduce the communication traffic of the unnecessary information.

However, since the Patent Document 1 does not consider the overhead at the intervehicle communication establishment, it cannot solve the problem as described above.

In addition, since the Patent Document 1 is specialized in the intervehicle communication used for the driving support, applications available for the intervehicle communication are limited.

Likewise, since the Patent Document 2 does not consider the overhead at the time of establishing the intervehicle communication, it cannot solve the problem described above.

In addition, since the Patent Document 2 does not consider the alignments of the road on which the vehicle travels, the information from a vehicle having little positional relation with the own vehicle is communicated. Thus, the communication band of the intervehicle communication is likely to be pressed.

In the Patent Document 3, the relay apparatus requires time to acquire vehicle information, and to gather these information items. Thus, it prolongs the delay time up to the start of the real communication, and is unlikely to be applicable for urgent vehicle control or driving support.

In addition, since the Patent Document 3 does not refer to the problems of the intervehicle communication such as overhead, it cannot solve them.

The present invention is implemented to solve the foregoing problems. Therefore it is an object of the present invention to provide an onboard apparatus capable of reducing the overhead at the time of establishing the intervehicle communication and thus improving the communication efficiency, a cloud server that manages the intervehicle communication, and an intervehicle communication system and an intervehicle communication method using them.

Means for Solving the Problems

An onboard apparatus in accordance with the present invention is an onboard apparatus which estimates a position and traveling direction of a vehicle from a vehicle state and map information, and determines a vehicle to exchange intervehicle communication, and which carries out communication with a cloud server that creates and transmits communication establishment information necessary for establishing intervehicle communication between the vehicles decided to exchange the intervehicle communication, the onboard apparatus comprising: a vehicle information acquirer to obtain vehicle information about the vehicle state of its own vehicle; a cloud communicator to transmit the vehicle information the vehicle information acquirer obtains to the cloud server, and to receive the communication establishment information transmitted from the cloud server; an intervehicle communicator to carry out intervehicle communication; and a controller to instruct the intervehicle communicator to perform the intervehicle communication and to establish communication in accordance with the communication establishment information the cloud communicator receives.

Advantages of the Invention

According to the present invention, it offers an advantage of being able to reduce the overhead at the time of establishing the intervehicle communication, and thus to improve the communication efficiency.

BEST MODE FOR CARRYING OUT THE INVENTION

The best mode for carrying out the invention will now be described with reference to the accompanying drawings to explain the present invention in more detail.

Embodiment 1

Figure 1:
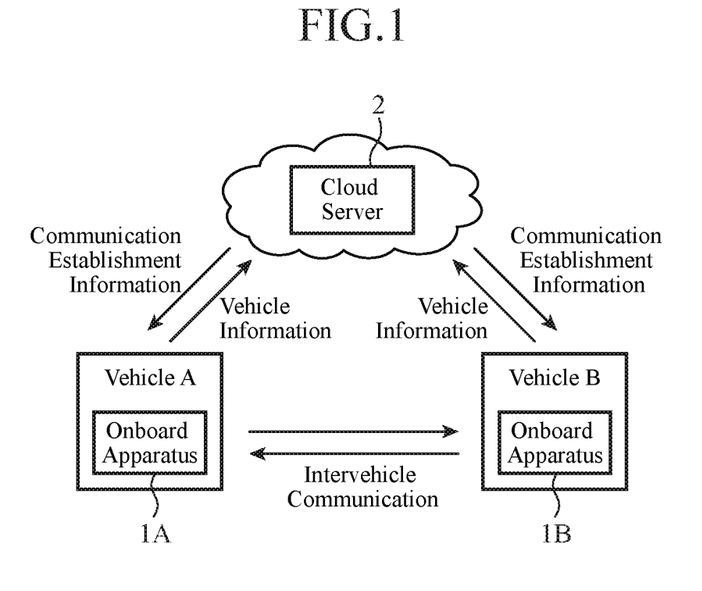
FIG. 1 is a block diagram showing a configuration of an intervehicle communication system in accordance with the present invention.

FIG. 1 is a block diagram showing a configuration of an intervehicle communication system in accordance with the present invention, which shows an example that carries out intervehicle communication between an onboard apparatus 1A of a vehicle A and an onboard apparatus 1B of a vehicle B. As shown in FIG. 1, the intervehicle communication system in accordance with the present invention comprises the onboard apparatus 1A of the vehicle A, the onboard apparatus 1B of the vehicle B and a cloud server 2.

The onboard apparatus 1A (1B) uploads vehicle information about its own vehicle through communication with the cloud server 2. The vehicle information is the information about a vehicle state such as positional information and speed information of the vehicle. In addition, the cloud server 2 estimates the position and the direction of travel of the vehicle A (B) equipped with the onboard apparatus 1A (1B) from the vehicle information and map information received from the onboard apparatus 1A (1B).

Next, when the cloud server 2 decides from the estimated positions and the directions of travel of the vehicles A and B that the vehicles A and B have specific positional relationships to carry out intervehicle communication, it constructs an intervehicle communication network between the onboard apparatus 1A and the onboard apparatus 1B.

For example, during the auto cruise by exchanging information through the intervehicle communication, if the cloud server 2 estimates that the vehicle A and vehicle B travel on the same lane of the same road, and that they have positional relationships of traveling immediately before or behind, it decides that the vehicle A and vehicle B are vehicles decided to exchange the intervehicle communication.

In addition, the cloud server 2 creates communication establishment information necessary for establishing the intervehicle communication between the onboard apparatus 1A and onboard apparatus 1B, and transmits it to the onboard apparatuses 1A and 1B. Incidentally, the communication establishment information includes a communication channel used by the intervehicle communication and the radio field intensity.

In the onboard apparatuses 1A and 1B, they can establish the intervehicle communication by only setting the communication establishment information received from the cloud server 2. Thus, the onboard apparatuses 1A and 1B share the vehicle information on the other via the intervehicle communication, and carry out the vehicle control or driving support.

Figure 2:
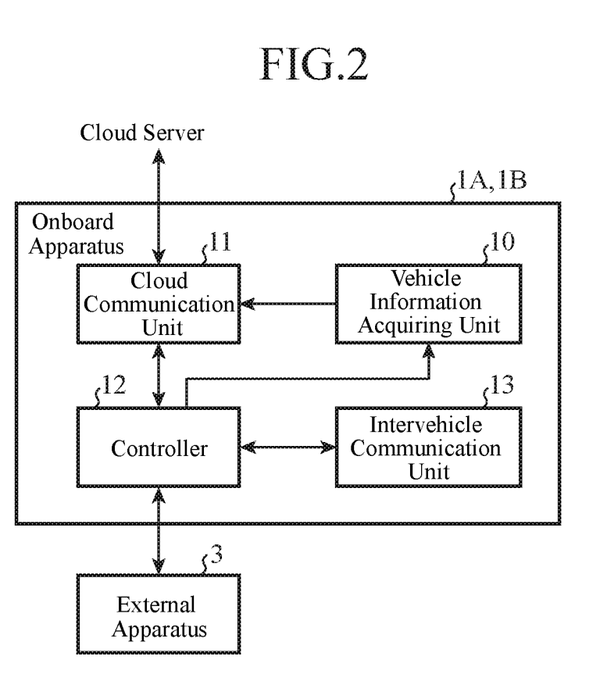
FIG. 2 is a block diagram showing a configuration of an onboard apparatus of an embodiment 1.

FIG. 2 is a block diagram showing a configuration of the onboard apparatus of the embodiment 1, which shows a configuration of the onboard apparatus 1A (1B) shown in FIG. 1. As shown in FIG. 2, the onboard apparatus 1A (1B) comprises a vehicle information acquiring unit 10, a cloud communication unit 11, a controller 12 and an intervehicle communication unit 13.

The vehicle information acquiring unit 10 acquires the vehicle information on the vehicle A (B). For example, it acquires the vehicle information through a connection with an ECU (electronic control unit) or a sensor group equipped on the vehicle A (B).

Incidentally, the vehicle information acquiring unit 10 obtains the vehicle information on the vehicle A (B) continuously or at prescribed intervals, and outputs it to the cloud communication unit 11.

The cloud communication unit 11 is a communication unit that carries out communication with the cloud server 2, and establishes a communication connection with the cloud server 2 via a public network such as the high-speed communication standards (4G). In addition, the cloud communication unit 11 transmits the vehicle information the vehicle information acquiring unit 10 obtains to the cloud server 2, and receives the communication establishment information transmitted from the cloud server 2.

Here, when the cloud communication unit 11 receives the vehicle information from the vehicle information acquiring unit 10, it immediately transmits it to the cloud server 2. Thus, the vehicle information newly obtained by the vehicle information acquiring unit 10 is successively transmitted to the cloud server 2.

Incidentally, although FIG. 2 shows an example in which the cloud communication unit 11 is contained in the same casing as the onboard apparatus 1A (1B), it can be separate from the casing of the onboard apparatus 1A (1B).

The controller 12 executes processing using the information obtained by the cloud communication unit 11 and the intervehicle communication unit 13. For example, according to the communication establishment information the cloud communication unit 11 receives, the controller 12 causes the intervehicle communication unit 13 to establish the intervehicle communication.

In addition, the controller 12 performs the vehicle control or driving support by using the data exchanged by the intervehicle communication. Incidentally, when information (such as driving support information) to be provided to a driver occurs, the controller 12 can give information to the driver using the external apparatus 3.

The external apparatus 3 is a device for exchanging information through connection with the controller 12, and a mobile terminal such as a mobile phone or a smartphone is used as the external apparatus 3.

The intervehicle communication unit 13, which is a communication unit that carries out the intervehicle communication, establishes the intervehicle communication in accordance with the communication establishment information the cloud communication unit 11 receives from the cloud server 2. After establishing the intervehicle communication, the intervehicle communication unit 13 exchanges data with the onboard apparatus of a communication party in accordance with a command of the controller 12.

Incidentally, the vehicle information acquiring unit 10, cloud communication unit 11, controller 12 and intervehicle communication unit 13 are realized as a concrete means which causes hardware and software to cooperate by a microcomputer that executes programs describing the specific processing of the present invention.

Figure 3:
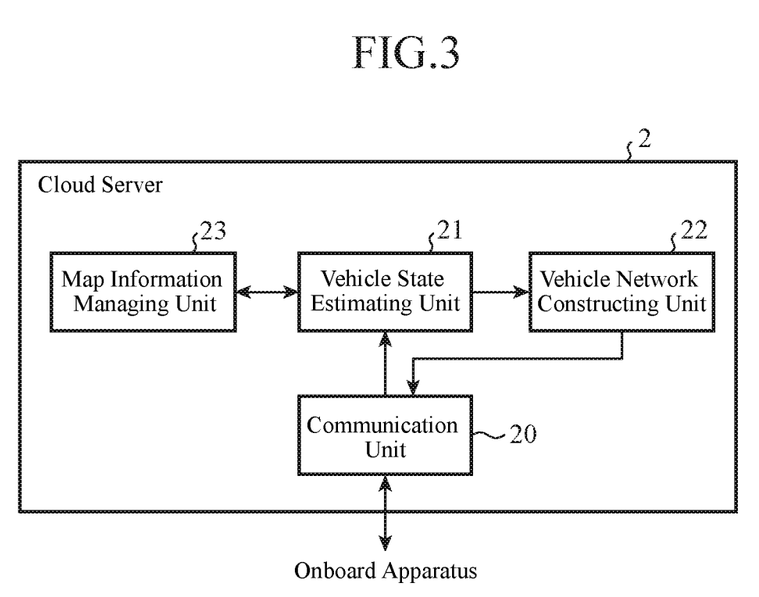
FIG. 3 is a block diagram showing a configuration of a cloud server of the embodiment 1.

FIG. 3 is a block diagram showing a configuration of the cloud server of the embodiment 1. As shown in FIG. 3, the cloud server 2 comprises a communication unit 20, a vehicle state estimating unit 21, a vehicle network constructing unit 22 and a map information managing unit 23.

The communication unit 20 is a communication unit that carries out communication with the cloud communication unit 11 of the onboard apparatus 1A (1B). In addition, the communication unit 20 receives the vehicle information transmitted from the onboard apparatus 1A (1B), and transmits the communication establishment information the vehicle network constructing unit 22 creates to the onboard apparatuses 1A and 1B of the vehicles A and B to exchange the intervehicle communication.

The vehicle state estimating unit 21 has a function of estimating the vehicle state of the vehicle A (B) equipped with the onboard apparatus 1A (1B), and estimates the position and the direction of travel of the vehicle A (B) according to the vehicle information uploaded from the onboard apparatus 1A (1B) and the map information.

For example, when the vehicle state estimating unit 21 receives the vehicle information from the onboard apparatus 1A (1B) via the communication unit 20, it stores the vehicle information successively in the memory as history information. Then, according to the time variations of the position of the vehicle A (B) contained in the vehicle information of the history information and the map information, the vehicle state estimating unit 21 estimates the real time position and the direction of travel (including the velocity) of the vehicle A (B).

The vehicle network constructing unit 22 determines the vehicle to exchange the intervehicle communication from the position and traveling direction of the vehicle the vehicle state estimating unit 21 estimates, and creates the communication establishment information necessary for establishing the intervehicle communication between the vehicles decided to exchange the intervehicle communication.

For example, if the vehicles A and B satisfy the specific conditions for carrying out the intervehicle communication, and the vehicles are present in areas that enable the onboard apparatuses 1A and 1B to carry out the intervehicle communication, the vehicle network constructing unit 22 decides that it can construct a vehicle network for the intervehicle communication. As the specific conditions, besides the foregoing condition that the vehicles are traveling on the same road, there are such conditions that the vehicles perform group traveling, or that the vehicles are traveling at a location to be provided with the driving support (such as an accident-prone intersection).

In addition, if one of the onboard apparatuses of the vehicles decided to exchange the intervehicle communication has already constructed a vehicle network for the intervehicle communication with another onboard apparatus, the vehicle network constructing unit 22 enables the other onboard apparatus of the vehicles decided to exchange the intervehicle communication to carry out the intervehicle communication through the existing vehicle network.

For example, the vehicle network constructing unit 22 creates the same communication establishment information as that transmitted at the time of constructing the existing vehicle network, and transmits it to the onboard apparatus (the other onboard apparatus described above) through the communication unit 20. Thus, the other onboard apparatus can also be added to the existing vehicle network.

The map information managing unit 23, which is a unit for managing the map information, acquires the map information requested by the vehicle state estimating unit 21.

For example, the vehicle state estimating unit 21 requests to send the map information around the position of the vehicle contained in the vehicle information, and uses it for estimating the position and traveling direction of the vehicle.

Incidentally, the map information can be stored in a storage the cloud server 2 comprises, or can be downloaded from an external map information server.

Incidentally, the communication unit 20, vehicle state estimating unit 21, vehicle network constructing unit 22 and map information managing unit 23 can be realized as a concrete means which causes hardware and software to cooperate by a microcomputer that executes programs describing the specific processing of the present invention.

Next, the operation will be described.

Figure 4:
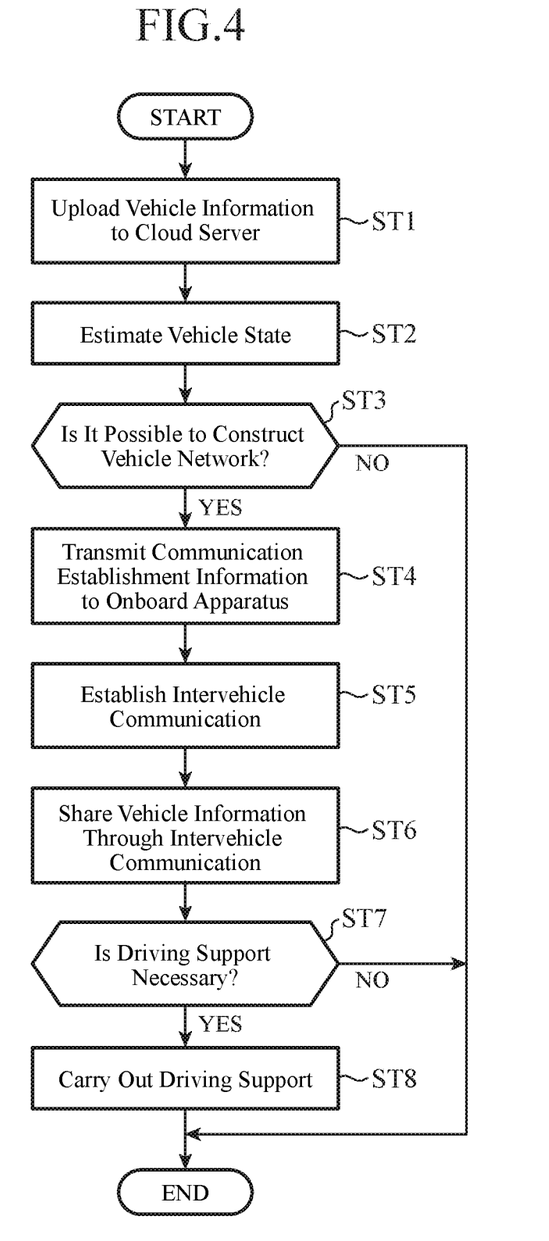
FIG. 4 is a flowchart showing the operation of the intervehicle communication system of the embodiment 1.

FIG. 4 is a flowchart showing the operation of the intervehicle communication system of the embodiment 1, which shows the processing by which it establishes the intervehicle communication between the onboard apparatus 1A and the onboard apparatus 1B, and then the onboard apparatus 1A (1B) carries out driving support using the intervehicle communication.

The cloud communication unit 11 of the onboard apparatus 1A (1B) uploads the vehicle information on the vehicle A (B) to the cloud server 2 (step ST1). Incidentally, as for the positional information contained in the vehicle information, it can be positional information the external apparatus 3 detects. For example, when the external apparatus 3 is a car navigation system or a mobile terminal like a smartphone, it can detect the positional information using the GPS information or the like.

In the cloud server 2, the vehicle state estimating unit 21 estimates as the vehicle state the position and the direction of travel of the vehicle A (B) from the vehicle information on the vehicle A (B) the communication unit 20 receives and from the map information it acquires from the map information managing unit 23 (step ST2).

Next, according to the position and the direction of travel of the vehicle A (B) the vehicle state estimating unit 21 estimates, the vehicle network constructing unit 22 decides whether it can construct the vehicle network for the intervehicle communication between the onboard apparatus 1A and the onboard apparatus 1B or not (step ST3). Here, the term "construction of the vehicle network" refers to making a decision as to whether the vehicle A (B) is eligible for the vehicle group to carry out the intervehicle communication.

As for the construction conditions of the vehicle network, which are the specific conditions as described above, an example can be mentioned in which the vehicles A and B travel on the same road and are present in areas that enable them to carry out the intervehicle communication with each other, for example.

As the specific conditions, besides the condition that the vehicles A and B are traveling on the same road, there are conditions that the vehicles A and B perform the group traveling, or that the vehicles A and B are traveling at a location to be provided with the driving support (such as an accident-prone intersection).

In addition, even when the onboard apparatus 1A (1B) is not present in an area that enables them to carry out the intervehicle communication, if the vehicle network constructing unit 22 estimates that the communication will become possible because the areas that enable the intervehicle communication are about to become adjacent within a prescribed time, it can construct the vehicle network of the vehicle A (B).

If it cannot construct the vehicle network (NO at step ST3), it terminates the processing.

In contrast, if the vehicle network constructing unit 22 decides that it can construct the vehicle network of the onboard apparatus 1A and onboard apparatus 1B (YES at step ST3), it creates the communication establishment information necessary for establishing the intervehicle communication between the onboard apparatus 1A and the onboard apparatus 1B.

After that, the communication unit 20 transmits the communication establishment information the vehicle network constructing unit 22 creates to the onboard apparatuses 1A and 1B (step ST4).

Incidentally, since the vehicle network constructing unit 22 manages the existing vehicle network of the intervehicle communication, which has been constructed previously, if one of the onboard apparatuses 1A and 1B carries out the intervehicle communication through the existing vehicle network, the vehicle network constructing unit 22 confirms whether the other of the onboard apparatuses 1A and 1B can be added to the existing vehicle network. If it can be added, it transmits the communication establishment information used by the existing vehicle network to the other of the onboard apparatuses 1A and 1B.

Figure 5:
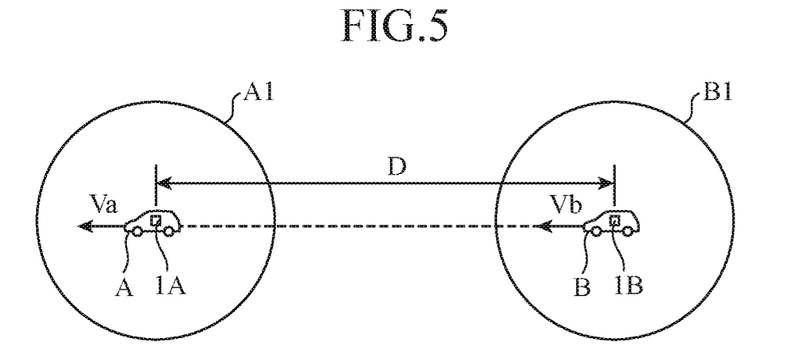
FIG. 5 is a diagram showing a case where intervehicle communication areas between vehicles are getting closer.

In addition, as shown in FIG. 5, even if the onboard apparatuses 1A and 1B are not present in the areas that enable the intervehicle communication, when estimating that the area A1 that enables the intervehicle communication of the onboard apparatus 1A and the area B1 that enables the intervehicle communication of the onboard apparatus 1B are getting closer, the vehicle network constructing unit 22 can create the communication establishment information necessary for establishing intervehicle communication between the onboard apparatus 1A and onboard apparatus 1B, and transmit it to the onboard apparatuses 1A and 1B through the communication unit 20.

In the example of FIG. 5, the vehicles A and B are separate by the distance D, and areas A1 and B1 that enable the intervehicle communication of the onboard apparatuses 1A and 1B, respectively, do not overlap. However, it show a case where the speed Vb of the vehicle B is higher than the speed Va of the vehicle A, and the estimate time until the areas A1 and B1 that enable the intervehicle communication come into contact is less than the prescribed time. In this case, the vehicle network constructing unit 22 decides that the areas A1 and B1 that enable the intervehicle communication of the onboard apparatuses 1A and 1B are close to each other, and that the communication will become possible within the prescribed time, so that it creates the communication establishment information about the intervehicle communication between the onboard apparatuses 1A and 1B in advance. The communication establishment information is transmitted to the onboard apparatuses 1A and 1B by the communication unit 20.

In addition, besides the communication establishment information, it can transmit to the onboard apparatuses 1A and 1B the estimate information indicating that the areas A1 and B1 that enable the intervehicle communication are getting closer.

The estimate information can include, for example, the estimate time until the areas A1 and B1 that enable the intervehicle communication come into contact and the time variations of the relative positions of the vehicles A and B. Incidentally, the estimate time can be computed from the radio field intensity of the intervehicle communication of the onboard apparatuses 1A and 1B, that is, from the areas A1 and B1, from the speed of the vehicles A and B or from the changes in relative positions of the vehicles A and B.

Incidentally, as for the vehicle speed, although the onboard apparatus can obtain it from the vehicle information acquiring unit 10, the cloud server 2 can calculate it from the changes in the position according to the positional information it receives from the onboard apparatuses.

The cloud communication unit 11 of the onboard apparatus 1A (1B) receives the communication establishment information sent from the cloud server 2, and outputs it to the controller 12. The controller 12 instructs the intervehicle communication unit 13 to carry out intervehicle communication in accordance with the communication establishment information it receives from the cloud communication unit 11. The intervehicle communication unit 13 establishes the intervehicle communication between the onboard apparatuses 1A and 1B in accordance with the instruction from the controller 12 (step ST5).

In addition, when receiving the estimate information indicating that the areas A1 and B1 that enable the intervehicle communication between the onboard apparatuses 1A and 1B are getting closer, the controller 12 of the onboard apparatus 1A (1B) can control the timing of establishing the intervehicle communication and the data distribution timing of the intervehicle communication in accordance with the estimate information. For example, when the cloud communication unit 11 receives the estimate time until the areas A1 and B1 come into contact as the estimate information, at the same time that the intervehicle communication becomes possible between the onboard apparatuses 1A and 1B after the estimate time has passed, the controller 12 instructs the intervehicle communication unit 13 to establish communication in accordance with the communication establishment information, and to start exchanging data through the intervehicle communication. This makes it possible to lengthen the real communication time of the intervehicle communication.

In addition, using the estimate time makes it possible to select only a vehicle that is very likely to perform the intervehicle communication, and to establish communication at the same time that the intervehicle communication becomes possible. More specifically, as for a vehicle which is out of the area that enables the intervehicle communication and which is unlikely to enter the area, the frequency of executing the processing for establishing the intervehicle communication is reduced, which enables only an appropriate vehicle to be handled as a target vehicle of the intervehicle communication.

After the intervehicle communication unit 13 establishes the communication, the controller 12 exchanges and shares the vehicle information with the vehicles A and B through the intervehicle communication (step ST6).

Next, the controller 12 decides the necessity of the driving support from the vehicle information on its own vehicle and the vehicle information on the communication party vehicle (step ST7).

For example, according to the vehicle information on its own vehicle and the vehicle information on the other vehicle, the controller 12 estimates as to whether its own vehicle may collide with the other vehicle or not, and if it estimates that the vehicles may collide, it decides that the driving support for avoiding a collision is necessary. In contrast, when it decides that the driving support is unnecessary (NO at step ST7), it terminates the processing.

If the controller 12 decides that the driving support of its own vehicle is necessary (YES at step ST7), it carries out the driving support (step ST8). For example, if it estimates a collision between its own vehicle and the other vehicle, it gives information about that to a driver through the external apparatus 3. This enables the driver of the vehicle A (B) to perform driving for avoiding a collision.

In addition, when the cloud communication unit 11 receives the information that the cloud server 2 estimates that its own vehicle may collide with the other vehicle, the controller 12 decides that the driving support for avoiding the collision is necessary, and executes informing processing through the external apparatus 3. This also enables the driver of the vehicle A (B) to perform driving for avoiding the collision.

Incidentally, if the communication between the cloud communication unit 11 and the cloud server 2 is cut off at step ST1, the controller 12 causes the intervehicle communication unit 13 to transmit (distribute) the communication establishment information at regular intervals as in a conventional example. The intervehicle communication unit 13 establishes communication with the onboard apparatus of the other vehicle in accordance with the communication establishment information exchanged through the intervehicle communication.

On the other hand, when the communication between the cloud communication unit 11 and the cloud server 2 is restarted, the controller 12 stops the distribution of the communication establishment information through the intervehicle communication unit 13, and causes the intervehicle communication to be established in accordance with the communication establishment information the cloud communication unit 11 receives from the cloud server 2.

In this way, even if the communication between the cloud communication unit 11 and the cloud server 2 is cut off, the establishment of the intervehicle communication becomes possible, which makes it possible to improve the stability of the communication.

As described above, according to the present embodiment 1, it comprises the vehicle information acquiring unit 10 to obtain the vehicle information about the vehicle state of its own vehicle; the cloud communication unit 11 to transmit the vehicle information the vehicle information acquiring unit 10 obtains to the cloud server 2, and to receive the communication establishment information transmitted from the cloud server 2; the intervehicle communication unit 13 to carry out intervehicle communication; and the controller 12 to instruct the intervehicle communication unit 13 to perform the intervehicle communication and to establish communication in accordance with the communication establishment information the cloud communication unit 11 receives. With such a configuration, the onboard apparatus itself need not transmit the communication establishment information at regular intervals, and can prevent the onboard apparatus of a vehicle unrelated to the real communication from transmitting the communication establishment information. Thus, it can reduce the overhead at the time of establishing the intervehicle communication, thereby being able to improve the communication efficiency.

In addition, according to the present embodiment 1, cloud communication unit 11 receives from the cloud server 2 the estimate information indicating that the area that enables the intervehicle communication of the intervehicle communication unit 13 and the area that enables the intervehicle communication of the onboard apparatus of the other vehicle are getting closer to each other. Thus, according to the estimate information, it can control the timing of establishing the intervehicle communication and the timing of distributing the data of the intervehicle communication.

Furthermore, according to the present embodiment 1, the cloud communication unit 11 receives from the cloud server 2 the communication establishment information necessary for establishing the intervehicle communication between the intervehicle communication unit 13 and the onboard apparatus of the other vehicle before the area that enables the intervehicle communication of the intervehicle communication unit 13 comes into contact with the area that enables the intervehicle communication of the onboard apparatus of the other vehicle. Thus, it can establish the intervehicle communication at the same time that its own vehicle and the other vehicle enter the area that enables the intervehicle communication.

Furthermore, according to the present embodiment 1, the cloud communication unit 11 receives from the cloud server 2 the estimate time until the area that enables the intervehicle communication of the intervehicle communication unit 13 comes into contact with the area that enables the intervehicle communication of the onboard apparatus of the other vehicle. Using the estimate time makes it possible to select only a vehicle that is likely to carry out the intervehicle communication, and to establish the communication at the same time that the intervehicle communication becomes possible. Thus, it can select only the appropriate vehicle as a target vehicle of the intervehicle communication.

Furthermore, according to the present embodiment 1, the controller 12 executes informing processing using an external apparatus 3 when estimating that its own vehicle may collide with the other vehicle from the vehicle information the vehicle information acquiring unit 10 obtains and from the vehicle information the intervehicle communication unit 13 receives from the onboard apparatus of the other vehicle.

In particular, it can immediately estimate the collision when the intervehicle communication becomes possible according to the estimate time until the areas that enable the intervehicle communication come into contact, and if it estimates the collision, it can inform the driver of that through the external apparatus 3.

Furthermore, according to the present embodiment 1, the controller 12 executes informing processing using the external apparatus 3 when the cloud communication unit 11 receives an estimate of the cloud server 2 that its own vehicle may collide with the other vehicle. This will offer the same advantages as described above.

Furthermore, according to the present embodiment 1, the controller 12 establishes, when the communication between the cloud communication unit 11 and the cloud server 2 is cut off, the intervehicle communication in accordance with the communication establishment information the intervehicle communication unit 13 exchanges, and establishes, when the communication between the cloud communication unit 11 and the cloud server 2 is restarted, the intervehicle communication in accordance with the communication establishment information the cloud communication unit 11 receives from the cloud server 2. Thus, it can establish the intervehicle communication even if the communication between the cloud communication unit 11 and the cloud server 2 is cut off, thereby being able to improve the stability of the communication.

Embodiment 2

Although an intervehicle communication system of the embodiment 2 has basically the same configuration as the embodiment 1, it differs in that it employs an application for content distribution rather than the application for the vehicle control or driving support. Accordingly, as for the configurations of the intervehicle communication system, onboard apparatus and cloud server, we will refer to FIG. 1, FIG. 2 and FIG. 3.

Next, the operation will be described

Figure 6:
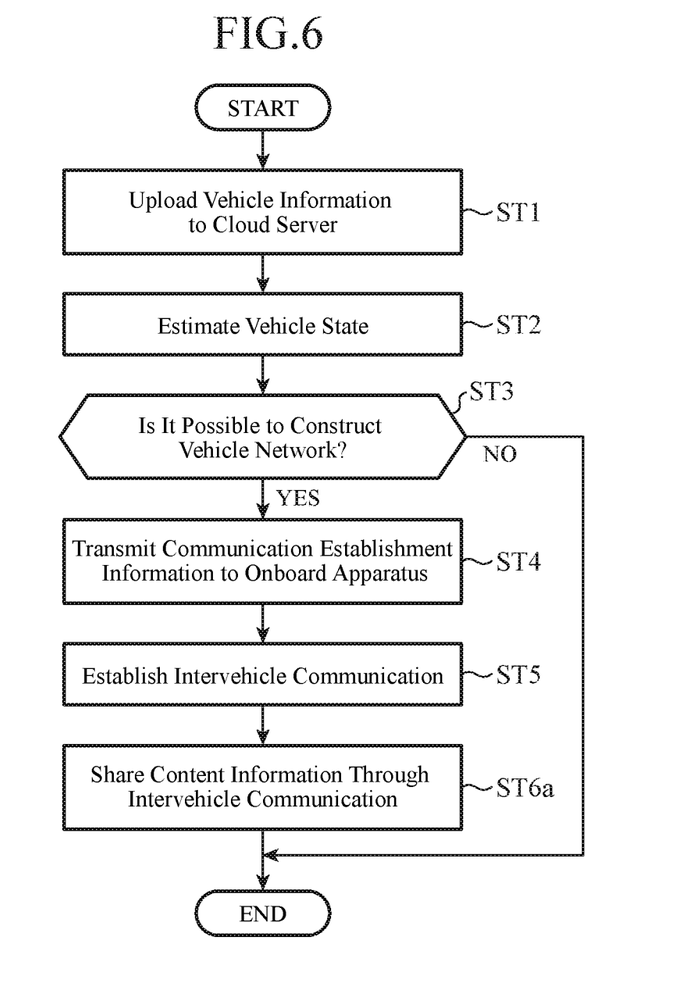
FIG. 6 is a flowchart showing the operation of the intervehicle communication system of an embodiment 2 in accordance with the present invention.

FIG. 6 is a flowchart showing the operation of the intervehicle communication system of the embodiment 2 in accordance with the present invention, which shows the processing that establishes the intervehicle communication between the onboard apparatus 1A and the onboard apparatus 1B, up to the processing in which the onboard apparatus 1A (1B) carries out the content distribution using the intervehicle communication.

Incidentally, in FIG. 6, since the processing from step ST1 to step ST5 is the same as that of FIG. 4, its description will be omitted.

In addition, it is assumed in the following description that the contents are received data (audio and video) of a videophone, and the external apparatus 3 is a videophone itself.

At step ST6a, when the communication of the intervehicle communication unit 13 is established, the controller 12 of the onboard apparatus 1A (1B) divides the content information it acquires from the external apparatus 3 into a prescribed size, and the intervehicle communication unit 13 distributes at regular intervals. The received content information is supplied to the external apparatus 3 so that it reproduces audio and video.

Figure 7:
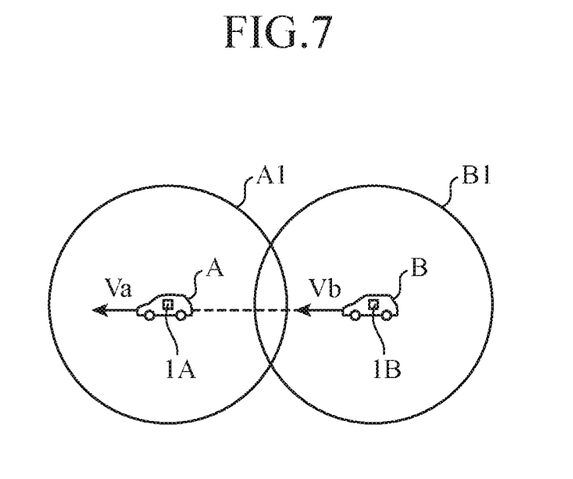
FIG. 7 is a diagram showing a case where intervehicle communication areas between vehicles are getting distant.

In addition, when the vehicle network constructing unit 22 of the cloud server 2 estimates as shown in FIG. 7 that the area A1 that enables the intervehicle communication of the onboard apparatus 1A is getting distant from the area B1 that enables the intervehicle communication of the onboard apparatus 1B, it can transmit the estimate information to the onboard apparatuses 1A and 1B through the communication unit 20. FIG. 7 shows an example in which although the areas A1 and B1 that enable the intervehicle communication of the onboard apparatuses 1A and 1B overlap each other, the speed Va of the vehicle A is higher than the speed Vb of the vehicle B, and the estimate time until the areas A1 and B1 that enable the intervehicle communication separate from each other is within the prescribed time.

If the cloud communication unit 11 receives from the cloud server 2 the estimate information indicating that the areas A1 and B1 that enable the intervehicle communication are about to separate, the controller 12 of the onboard apparatus 1A (1B) increases the traffic the intervehicle communication unit 13 transmits to its communication party.

The estimate information includes, for example, the estimate time until the areas A1 and B1 that enable the intervehicle communication separate from each other, time variations of the relative positions of the vehicles A and B, and the like. Incidentally, the estimate time can be computed from the radio field intensity of the intervehicle communication between the onboard apparatuses 1A and 1B, that is, from the variations of the areas A1 and B1, from the vehicle speed of the vehicles A and B or from the relative positions of the vehicles A and B.

When the cloud communication unit 11 receives as the estimate information the estimate time until the areas A1 and B1 separate, the controller 12 decides that if the estimate time becomes not greater than the prescribed time, it should transmit the content information until the intervehicle communication is cut off.

Thus, on the conditions that the communication band of the intervehicle communication unit 13 has leeway and the processing loads of the onboard apparatuses 1A and 1B have a margin, the controller 12 maximizes the communication band used by the intervehicle communication unit 13 and the processing loads of the onboard apparatus 1A and 1B to increase the intervehicle communication traffic so as to transmit the content information ahead of time.

Incidentally, as a method of increasing the intervehicle communication traffic, it is conceivable, for example, to shorten the transmission period, or to divide into channels to transmit in parallel. However, other methods can also be employed.

In this way, even if the vehicle A (B) is moving near the boundary between the areas A1 and B1 that enable the intervehicle communication, the present embodiment 2 can acquire the content information without delay.

As described above, according to the present embodiment 2, the cloud communication unit 11 receives from the cloud server 2 the estimate information indicating that the area that enables the intervehicle communication of the intervehicle communication unit 13 and the area that enables the intervehicle communication of the onboard apparatus of the other vehicle are about to separate from each other.

In this way, it can grasp the timing at which the intervehicle communication is cut off from the estimate information, and can control the data distribution of the intervehicle communication in accordance with the timing.

In addition, according to the present embodiment 2, the cloud communication unit 11 receives from the cloud server 2 the estimate time until the area that enables the intervehicle communication of the intervehicle communication unit 13 and the area that enables the intervehicle communication of the onboard apparatus of the other vehicle separate from each other; and the controller 12 instructs, when the estimate time is not greater than the prescribed time, the intervehicle communication unit 13 to increase intervehicle communication traffic with the onboard apparatus of the other vehicle.

In this way, even when the vehicle is moving near the boundary between the areas that enable the intervehicle communication, it can acquire the intervehicle communication data without delay.

Incidentally, it is to be understood that a free combination of the individual embodiments, variations of any components of the individual embodiments or removal of any components of the individual embodiments is possible within the scope of the present invention.

INDUSTRIAL APPLICABILITY

An onboard apparatus in accordance with the present invention can reduce the overhead at the time of establishing the intervehicle communication and improve the communication efficiency. Accordingly, it is suitable for a driving support apparatus that carries out driving support in accordance with the positional relationships with other vehicles.

DESCRIPTION OF REFERENCE SYMBOLS 1A, 1B onboard apparatus; 2 cloud server; 3 external apparatus; 10 vehicle information acquiring unit; 11 cloud communication unit; 12 controller; 13 intervehicle communication unit; 20 communication unit; 21 vehicle state estimating unit; 22 vehicle network constructing unit; 23 map information managing unit.

What is claimed is:

1. An onboard apparatus which estimates a position and traveling direction of a vehicle from a vehicle state and map information, and determines a vehicle to exchange intervehicle communication, and which carries out communication with a cloud server that creates and transmits communication establishment information necessary for establishing intervehicle communication between vehicles so as to exchange the intervehicle communication, the onboard apparatus comprising:
a vehicle information acquirer to obtain vehicle information about the vehicle state of its own vehicle;
a cloud communicator to transmit the vehicle information obtained by the vehicle information acquirer to the cloud server, and to receive the communication establishment information transmitted from the cloud server;
an intervehicle communicator to carry out intervehicle communication; and
a controller to instruct the intervehicle communicator to perform the intervehicle communication and to establish communication in accordance with the communication establishment information the cloud communicator receives,
wherein the cloud communicator receives, from the cloud server, estimate information indicating that an area that enables intervehicle communication of the intervehicle communicator and an area that enables the intervehicle communication of an onboard apparatus of another vehicle are getting closer to each other, in order to enable the intervehicle communication to become possible.

2. The onboard apparatus according to claim 1, wherein the cloud communicator receives from the cloud server the communication establishment information necessary for establishing intervehicle communication between the intervehicle communicator and the onboard apparatus of the other vehicle before the area that enables the intervehicle communication of the intervehicle communicator comes into contact with the area that enables the intervehicle communication of the onboard apparatus of the other vehicle.

3. The onboard apparatus according to claim 2, wherein the cloud communicator receives, from the cloud server, the estimate time until the area that enables the intervehicle communication of the intervehicle communicator comes into contact with the area that enables the intervehicle communication of the onboard apparatus of the other vehicle.

4. The onboard apparatus according to claim 3, wherein the controller executes informing processing using an external apparatus when estimating that its own vehicle may collide with the other vehicle from the vehicle information obtained by the vehicle information acquirer and from the vehicle information the intervehicle communicator receives from the onboard apparatus of the other vehicle.

5. The onboard apparatus according to claim 3, wherein the controller executes informing processing using an external apparatus when the cloud communicator receives an estimate of the cloud server that its own vehicle may collide with the other vehicle.

6. An onboard apparatus which estimates a position and traveling direction of a vehicle from a vehicle state and map information, and determines a vehicle to exchange intervehicle communication, and which carries out communication with a cloud server that creates and transmits communication establishment information necessary for establishing intervehicle communication between vehicles so as to exchange the intervehicle communication, the onboard apparatus comprising:
a vehicle information acquirer to obtain vehicle information about the vehicle state of its own vehicle;

a cloud communicator to transmit the vehicle information obtained by the vehicle information acquirer to the cloud server, and to receive the communication establishment information transmitted from the cloud server;
an intervehicle communicator to carry out intervehicle communication; and
a controller to instruct the intervehicle communicator to perform the intervehicle communication and to establish communication in accordance with the communication establishment information the cloud communicator receives,
wherein the cloud communicator receives, from the cloud server, estimate information indicating that an area that enables the intervehicle communication of the intervehicle communicator and an area that enables the intervehicle communication of the onboard apparatus of the other vehicle are about to separate from each other.

7. The onboard apparatus according to claim 6, wherein the cloud communicator receives, from the cloud server, the estimate time until the area that enables the intervehicle communication of the intervehicle communicator separates from the area that enables the intervehicle communication of the onboard apparatus of the other vehicle; and
the controller instructs, when the estimate time is not greater than a prescribed time, the intervehicle communicator to increase intervehicle communication traffic with the onboard apparatus of the other vehicle.

8. The onboard apparatus according to claim 1, wherein the controller establishes, when communication between the cloud communicator and the cloud server is cut off, the intervehicle communication in accordance with the communication establishment information the intervehicle communicator exchanges, and establishes, when the communication between the cloud communicator and the cloud server is restarted, the intervehicle communication in accordance with the communication establishment information the cloud communicator receives from the cloud server.

9. A cloud server which carries out communication with an onboard apparatus that transmits vehicle information about a vehicle state, the cloud server comprising:
a map information manager to manage map information;
a vehicle state estimator to estimate a position and traveling direction of the vehicle from the vehicle information and from the map information the map information manager manages;
a vehicle network constructing unit to determine a vehicle to exchange intervehicle communication from the position and traveling direction of the vehicle the vehicle state estimator estimates, and to create communication establishment information necessary for vehicles so as to exchange the intervehicle communication to establish the intervehicle communication; and
a communicator to receive the vehicle information transmitted from the onboard apparatuses of the vehicles, and to transmit the communication establishment information created by the vehicle network constructing unit to the onboard apparatuses of vehicles so as to exchange the intervehicle communication,
wherein the communicator transmits estimate information indicating that an area that enables intervehicle communication of an onboard apparatus of the vehicle and an area that enables the intervehicle communication of an onboard apparatus of another vehicle are getting closer to each other, in order to enable the intervehicle communication to become possible.

10. An intervehicle communication system having a cloud server and an onboard apparatus, wherein the cloud server comprises:
a map information manager to manage map information;
a vehicle state estimator to estimate a position and traveling direction of a vehicle from vehicle information about a vehicle state of a vehicle and from the map information the map information manager manages;
a vehicle network constructing unit to determine a vehicle to exchange intervehicle communication from the position and traveling direction of the vehicle the vehicle state estimator estimates, and to create communication establishment information necessary for vehicles so as to exchange the intervehicle communication to establish the intervehicle communication; and
a communicator to receive the vehicle information transmitted from the onboard apparatuses of the vehicles, and to transmit the communication establishment information created by the vehicle network constructing unit to the onboard apparatuses of vehicles so as to exchange the intervehicle communication, and wherein the onboard apparatus comprises:
a vehicle information acquirer to obtain the vehicle information about the vehicle state of its own vehicle;
a cloud communicator to transmit the vehicle information obtained by the vehicle information acquirer to the cloud server, and to receive the communication establishment information transmitted from the cloud server;
an intervehicle communicator to carry out intervehicle communication; and
a controller to instruct the intervehicle communicator to perform the intervehicle communication and to establish communication in accordance with the communication establishment information the cloud communicator receives,
wherein the cloud communicator receives, from the cloud server, estimate information indicating that an area that enables intervehicle communication of the intervehicle communicator and an area that enables the intervehicle communication of an onboard apparatus of another vehicle are getting closer to each other, in order to enable the intervehicle communication to become possible.

11. An intervehicle communication method of an onboard apparatus, which estimates a position and traveling direction of a vehicle from a vehicle state and map information, and determines a vehicle to exchange intervehicle communication, and which carries out communication with a cloud server that creates and transmits communication establishment information necessary for establishing the intervehicle communication between vehicles so as to exchange the intervehicle communication, the intervehicle communication method comprising:
obtaining, by a vehicle information acquirer, vehicle information about a vehicle state of its own vehicle;
transmitting, by a cloud communicator, the vehicle information obtained by the vehicle information acquirer to the cloud server, and receiving the communication establishment information transmitted from the cloud server;
instructing, by a controller, an intervehicle communicator to perform intervehicle communication in accordance with the communication establishment information the cloud communicator receives;

establishing, by an intervehicle communicator, the intervehicle communication and carrying out communication in accordance with the instruction from the controller; and receiving, by the cloud communicator, from the cloud server, estimate information indicating that an area that enables intervehicle communication of the intervehicle communicator and an area that enables the intervehicle communication of an onboard apparatus of another vehicle are getting closer to each other, in order to enable the intervehicle communication to become possible.

12. An intervehicle communication method in a system including a cloud server and an onboard apparatus, the intervehicle communication method comprising:

obtaining, by a vehicle information acquirer, vehicle information about a vehicle state of its own vehicle;

transmitting, by a cloud communicator of the onboard apparatus, the vehicle information obtained by the vehicle information acquirer to the cloud server;

estimating, by a vehicle state estimator, a position and traveling direction of the vehicle from the vehicle information and map information;

determining, by a vehicle network constructing unit, a vehicle to exchange intervehicle communication from the position and traveling direction of the vehicle the vehicle state estimator estimates, and creating communication establishment information necessary for vehicles so as to exchange the intervehicle communication to establish the intervehicle communication;

transmitting, by a communicator, the communication establishment information created by the vehicle network constructing unit to vehicles so as to exchange the intervehicle communication;

receiving, by a cloud communicator of the onboard apparatus of vehicles so as to exchange the intervehicle communication, the communication establishment information transmitted from the cloud server;

instructing, by a controller, an intervehicle communicator to perform the intervehicle communication in accordance with the communication establishment information the cloud communicator receives;

establishing, by the intervehicle communicator, intervehicle communication and carrying out communication in accordance with the instruction from the controller; and transmitting, by the communicator, from the cloud server, estimate information indicating that an area that enables intervehicle communication of the intervehicle communicator and an area that enables the intervehicle communication of an onboard apparatus of another vehicle are getting closer to each other, in order to enable the intervehicle communication to become possible.

* * * * *